US010255550B1

(12) United States Patent
Simkoff et al.

(10) Patent No.: US 10,255,550 B1
(45) Date of Patent: Apr. 9, 2019

(54) MACHINE LEARNING USING MULTIPLE INPUT DATA TYPES

(71) Applicant: States Title, Inc., San Francisco, CA (US)

(72) Inventors: Maxwell Simkoff, San Francisco, CA (US); Michael Housman, Beverly Hills, CA (US)

(73) Assignee: States Title, Inc., San Francisco, CA (US)

( * ) Notice: Subject to any disclaimer, the term of this patent is extended or adjusted under 35 U.S.C. 154(b) by 116 days.

(21) Appl. No.: 15/616,249

(22) Filed: Jun. 7, 2017

(51) Int. Cl.
| | |
|---|---|
| *G06N 99/00* | (2010.01) |
| *G06N 3/08* | (2006.01) |
| *G06N 7/00* | (2006.01) |
| *G06N 20/00* | (2019.01) |

(52) U.S. Cl.
CPC ............... *G06N 3/08* (2013.01); *G06N 7/005* (2013.01); *G06N 20/00* (2019.01)

(58) Field of Classification Search
CPC .................................................. G06N 99/005
USPC .......................................................... 706/45
See application file for complete search history.

(56) References Cited

U.S. PATENT DOCUMENTS

| | | | | |
|---|---|---|---|---|
| 5,361,201 | A * | 11/1994 | Jost ........................ | G06Q 40/02 705/35 |
| 2004/0059653 | A1* | 3/2004 | Verkuylen .............. | G06Q 40/02 705/35 |
| 2010/0063948 | A1* | 3/2010 | Virkar .................. | G06N 99/005 706/12 |
| 2013/0204823 | A1* | 8/2013 | Treiser ..................... | G06N 5/02 706/46 |

* cited by examiner

*Primary Examiner* — Lut Wong
(74) *Attorney, Agent, or Firm* — Fish & Richardson P.C.

(57) ABSTRACT

Methods, systems, and apparatus, including computer programs encoded on computer storage media, for training and applying a machine learning model. One of the methods includes the actions of obtaining a plurality of data points associated with a specified object; using a machine learning model to generate a prediction from the obtained plurality of data points, the prediction indicating a likelihood that the object will satisfy a particular parameter and a predicted scope for the parameter, wherein the machine learning model is trained using a training set comprising a collection of data points associated with a labeled set of objects, the label indicating the particular parameter and value for each object of the training set; and based on the prediction, classifying the specified object according to a determination of whether the predicted scope satisfies a threshold value.

19 Claims, 7 Drawing Sheets

MACHINE LEARNING USING MULTIPLE INPUT DATA TYPES

BACKGROUND

This specification relates to machine learning. Conventional machine learning models can be used to classify particular input data. Typically, a machine learning model is trained using a collection of labeled training data. The machine learning model can be trained such that the model correctly labels the input training data. New data can then be input into the machine learning model to determine a corresponding label for the new data.

SUMMARY

In general, one innovative aspect of the subject matter described in this specification can be embodied in methods that include the actions of obtaining, in real-time and from one or more sources, a plurality of data points associated with a specified parcel of real property; using a machine learning model to generate a prediction from the obtained plurality of data points, the prediction indicating a likelihood that the real property will satisfy a particular parameter and a predicted scope for the parameter, wherein the machine learning model is trained using a training set comprising a collection of data points associated with a labeled set of real property parcels, the label indicating the particular parameter and value for each real property parcel of the training set; and based on the prediction, classifying the specified parcel of real property according to a determination of whether the predicted scope satisfies a threshold value.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The obtained plurality of data points comprises a variety of data from a variety of data sources. The obtained plurality of data points is obtained from both structured data sources and unstructured data sources. Obtaining data points from unstructured data includes processing the unstructured data to identify particular types of information including performing image recognition on images contained within the unstructured data. Each data point is associated with a particular data type and wherein each data type is weighted in the machine learning model. The weight given to each data type varies depending on a particular mix of data types input to the machine learning model. Values for data points input into the machine learning model for different parcels of real property are tracked to determine whether the values actually input correspond to values anticipated by the machine learning model. An actual outcome with respect to the particular parameter for the specific parcel of real property is determined and compared with the prediction. In response to identifying inaccuracies in one or more predictions, adjusting the machine learning model based on updated training data.

The subject matter described in this specification can be implemented in particular embodiments so as to realize one or more of the following advantages. A machine learning model can be used to predict a risk of a title defect for a parcel or real property using data examples of other parcels of real property to train the model. This reduces time and effort needed to make a first pass at decisions regarding title risk and insurance for the parcel. Parcels that fail this first pass can then be evaluated using conventional title search techniques.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes techniques for training and applying a machine learning model. The machine learning model can be trained to predict whether a parameter is likely to occur as well as a magnitude of the parameter. The machine learning model can be trained using a collection of data with known values for the prediction parameter. The output of the machine learning model can be compared with one or more thresholds to determine an action responsive to the prediction.

In some implementations, the trained machine learning model can be applied to input data values obtained from one or more data sources. Each of the data values can be associated with a particular data type. The data types can each have a determined weight in the machine learning model.

In some implementations, the input data values used as input to the machine learning model can be monitored and used to evaluate whether the model was trained using data values comparable to the actual input data values. In some other implementations, the prediction for the parameter can be stored and later compared to an actual value for the parameter. Prediction errors can be used to update the machine learning model.

For example, the machine learning model can be used to evaluate a parameter associated with a parcel of real property based on a model trained from data obtained for a collection of other parcels of real property. The parameter being predicted can include a prediction of the existence of a title defect in the parcel of real property and a magnitude of the potential value of the title defect.

In particular, in a real estate transaction involving a parcel of real property, an important step is ascertaining whether there are any other interests, e.g., lienholders, or encumbrances, e.g., easements, on the subject parcel as well as establishing chain of title to ensure that the seller has an actual sellable interest in the parcel. Evaluation of the title history typically involves a search of various public records for the parcel. Any identified defects, for example, an existing lien on the parcel, typically need to be resolved before a title company will issue title insurance for the parcel. In the event that an unidentified defect is later discovered, the title insurance insures against any losses resulting from the defect. Consequently, title insurance is often required in real estate transactions and particularly for those financed by third parties.

Training a Machine Learning Model

Figure 1:
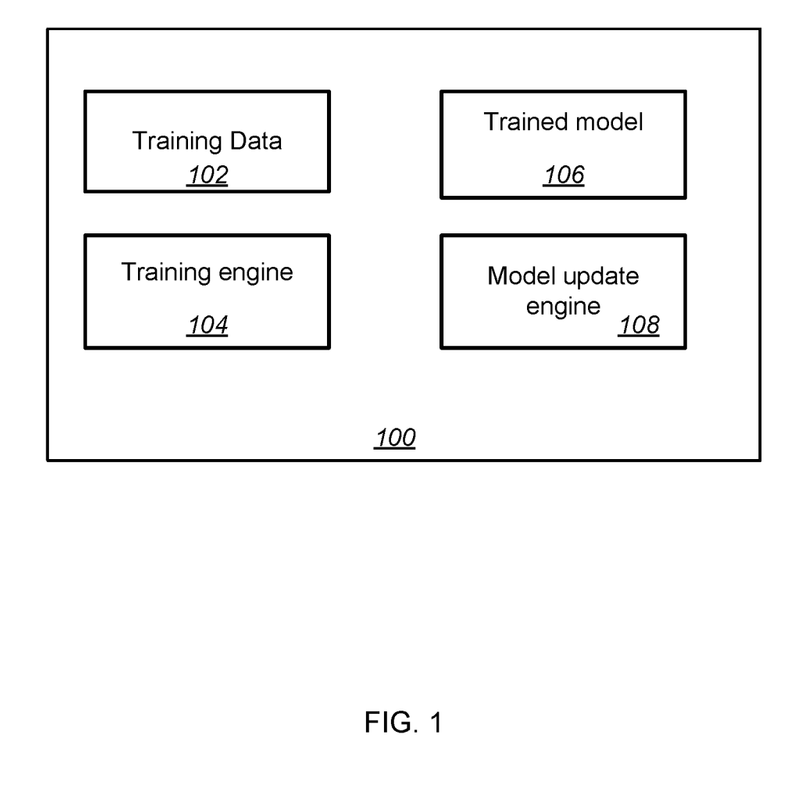
FIG. 1 is a block diagram of an example system for training a machine learning model.

FIG. 1 shows a block diagram of an example system 100 for training a machine learning model. The system 100 receives training data from one or more data sources. The training data can be stored in a training data repository 102. The training data for a machine learning model often includes values for the parameter being predicted by the model.

For example, in some implementations, the training data includes data values associated with a number of distinct parcels of real property. The data values for each parcel of real property can cover a variety of data including statistical data about the property itself, e.g., size, age, composition, a retail history for the property, e.g., prior dates of sale, and characterizations of property condition, e.g., from an appraisal. In some implementations, the data can also include information associated with past purchaser and sellers of the parcel including credit information, property tax information, geographic information, crime data, and or other relevant data associated with the parcel. Additionally, for each parcel of real property the data can include information on prediction parameter, namely, whether any defect in title was discovered and the value of the defect resolution.

The obtained training data is used as input to a training engine 104 that trains a machine learning model based on the data and the known parameter values. As part of the training, the training engine 104 extracts features from the training data and assigns various weights to the features such that a prediction and magnitude for the parameter correspond to the known parameter values. In some implementations, the features correspond to the different types of data in the training data or a subset of the types of data. The training of the model can be an iterative process that adjusts features and associated weights to some specified degree of accuracy relative to the known parameter values.

The trained model generated by the training engine 104 can be stored as an output model 106 or transmitted to another system. In some implementations, the model is stored until requested for use with respect to new input data. Additionally, an update and evaluation module 108 can be used to determine whether the existing model should be updated or retrained based on new training data or if the model should be otherwise adjusted.

Figure 2:
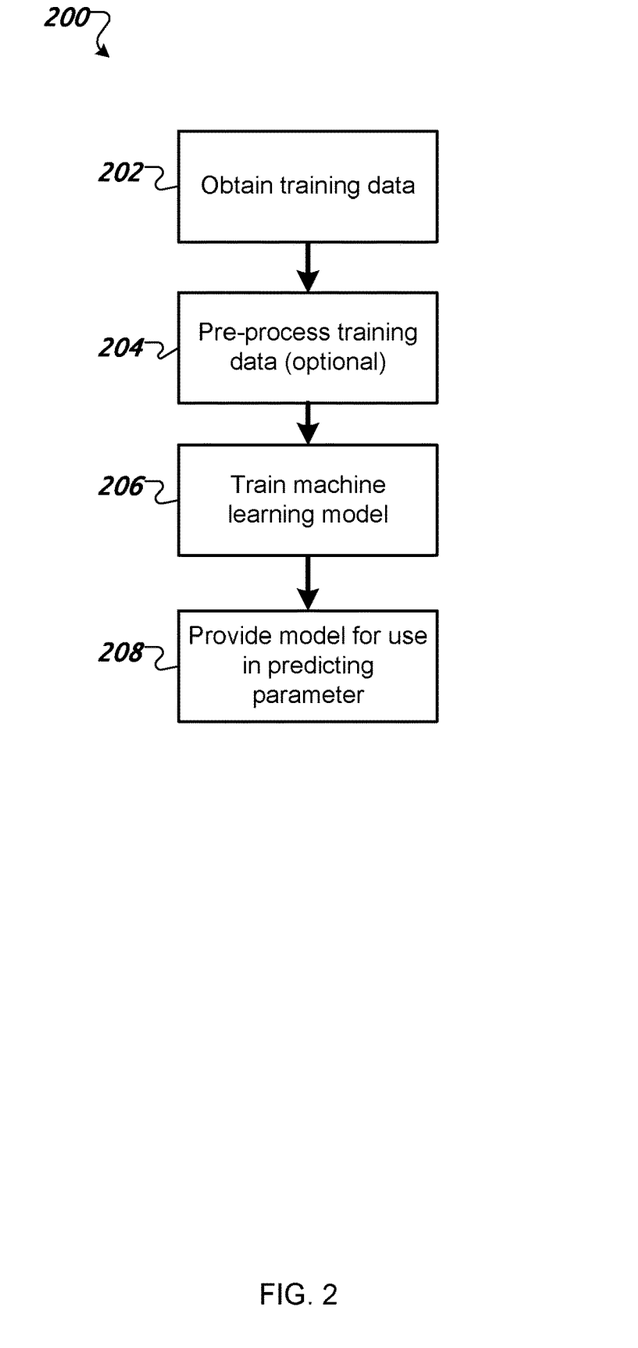
FIG. 2 is a flow diagram of an example method for training a machine learning model.

FIG. 2 is a flow diagram of an example method 200 for training a machine learning model. For convenience, the method 200 will be described with respect to a system that performs the method 200, for example, the example system 100 of FIG. 1.

The system obtains a collection of training data (202). The training data can be obtained from multiple data sources as described above. The obtained training data can be stored in a training data repository.

In some implementations, the obtained training data can undergo optional pre-processing (204). For example, the training data can include structured documents that can be parsed to identify particular data values. In some implementations, the parsing identifies both a data type and a value, e.g., as a tuple. Examples of (data type, value) pairs can be (year built; value) or (size; value). In some implementations, the obtained training data includes unstructured content that that is processed to identify particular data. Additional discussion on processing unstructured content is described below with respect to FIG. 5.

The system uses the training data to train a machine learning model (206). The machine learning model can be based off of one or more existing machine learning models as a foundation and configured to use data value types as features to train the model to generate a prediction for a specified parameter. The training can use an iterative process of adjusting weights assigned to data types to generate a final output model. In some implementations, the weight assigned to a particular data type can vary depending on the mix of data types actually input into the model. Thus, a particular data type may have more weight in some instances than in others depending on what other data types are input to the model.

The system can then provide the trained machine learning model for use in predicting the value of the parameter for a given set of input data values (208). Using the machine learning model is described in greater detail below with respect to FIGS. 3 and 4. In some implementations, the model is validated using additional input data having a known parameter value. For example, one or more values from data associated with a parcel of real property can be input to the model. The machine learning model then generates an output prediction for the parameter. The system can determine whether the generated prediction matches a known value for the parameter for the parcel of real property.

Applying the Trained Machine Learning Model to Input Data

Figure 3:
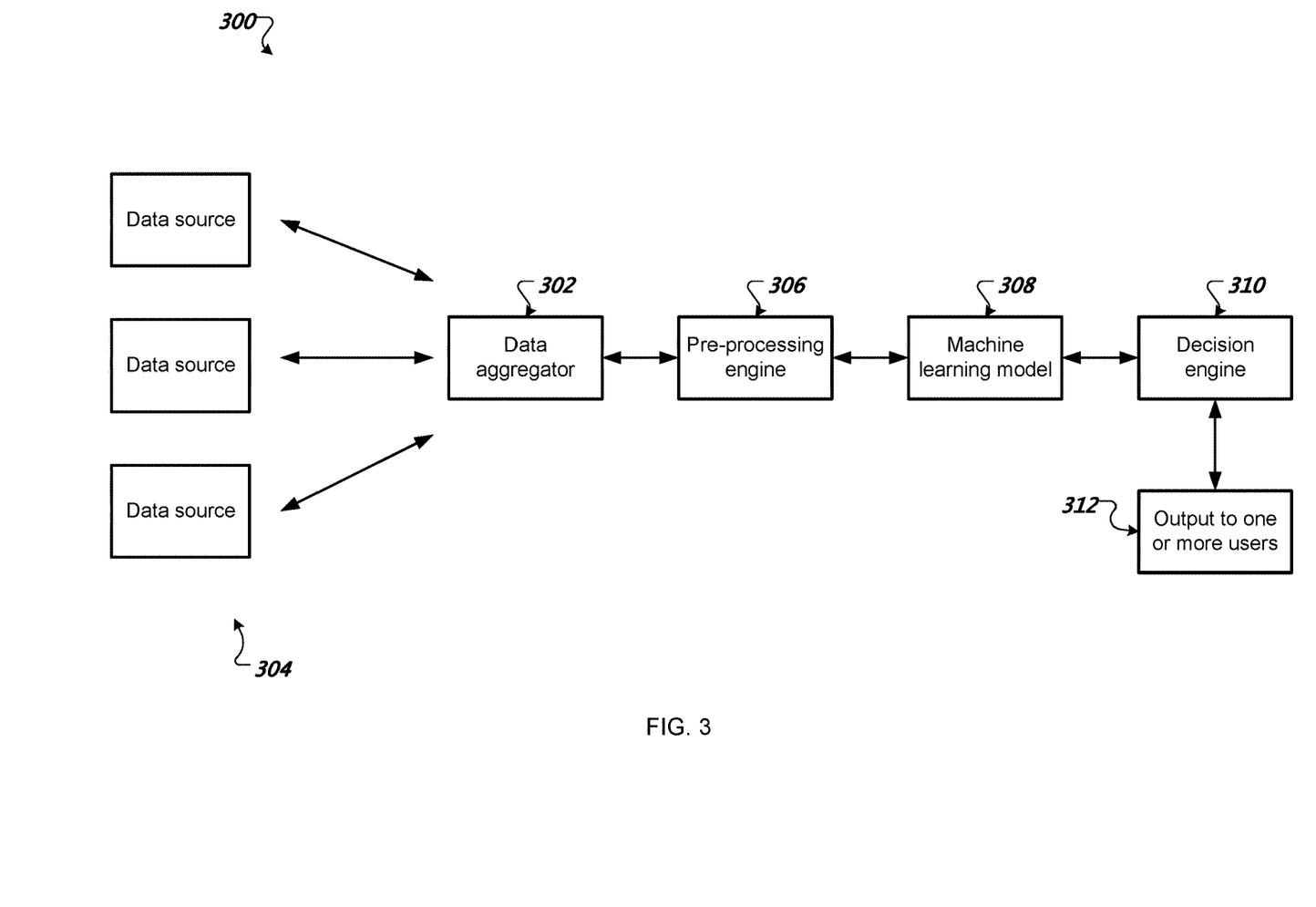
FIG. 3 is a block diagram of an example system for using a machine learning model to generate a prediction.

FIG. 3 is a block diagram of an example system 300 for using a machine learning model to generate a prediction for a parameter. The system 300 includes a data aggregator 302. The data aggregator 302 receives data from a variety of different data sources 304. The data sources 304 can include a number of different databases including databases associated with public records locations as well as third party databases. The data aggregator 302 can collect obtained data associated with a particular parcel of real estate. For example, in some implementations, the system 300 is able to receive data from different local records offices for real property e.g., county records offices or property tax offices. The system 300 can also receive data from third parties such as credit bureaus or title companies.

Additionally, in some implementations, the data sources 304 can include individual records relevant to a particular prediction being made. For example, when using the machine learning model to generate a prediction for a particular parcel of real estate, in addition to particular records obtained from databases as described above, individual records can also be obtained, for example, an appraisal of the particular parcel of real estate generated by an appraiser for the parcel.

Other possible data sources can include additional information associated with the particular parcel of real estate such as one or more of appraisal notes and photos, aerial photographs of property lines and roofs, publically available online maps images including images of property exterior from street level, building permit notes, or web scraping of any publicly-available references to the property. Other data sources can include information about the particular individual associated with the particular parcel of real estate, e.g., a purchaser of the parcel of real estate. This individual data can include one or more of credit scores, e.g., FICO scores, public records searches including, for example, LEXIS-NEXIS searches of individual names, social media accounts, or web scraping of references the individual.

In some implementations the data aggregator 302 provides the obtained data to a pre-processing engine 306. The pre-processing engine 306 performs some pre-processing of the obtained data. For example, the obtained data can include structured documents that can be parsed to identify particular data values. For example, a record of a previous transaction involving the parcel of real property can include structured data with particular fields having corresponding values. In some implementations, the parsing identifies both a data type and a value, e.g., as a tuple. For example, such a (data type, value pair) can be (year built; value) or (size; value).

In some implementations, the obtained training data includes unstructured content that that is processed to extract particular data. For example, optical character recognition can be used to identify content of a document which can be filtered based on identifying particular terms identified in the document. For example, if a document is recognized as having "sq ft" the system can pair this data type with a numerical value identified in close proximity. In another example, captions associated with image content can be analyzed for relevant semantic information, for example, information that indicates information about the condition of a parcel of real property. Furthermore, for a set of data types used by the machine learning model there can be associated synonyms. For example, a synonym for "sq ft" can be "square feet" such that either can be identified as the same data type.

The output of the pre-processing engine 306 can be a set of data type and value pairs for a particular parcel of real property. The output can be provided to a machine learning model 308 trained to generate a prediction for a parameter based on the values for the data types of the set.

The machine learning model 308 can be trained to take as input a large variety of data types. However, the machine learning model 308 does not need to have all data types input to generate a prediction. Thus, the machine learning model 308 has dynamic flexibility as to the particular input data allowing for predictions to be output for different sets of input data types. This advantageously allows the machine learning model 308 to be used when different data types are available to be obtained. For example, some parcels of real property may have values available for some data types and not others. The machine learning model 308 can be trained to assign particular weights to the data types depending both on data type and on the overall set of data types available to the model. Consequently, a value for a particular data type may have a different weight assisted to it depending on the overall mix of data type values provided as input to the machine learning model 308.

Additionally, the particular data types present or missing can add insight to the model. In particular, the presence or absence of a specific data type can provide input to the model in and of itself. For example, is particular identifying information for the parcel of real property or the individual purchaser are not found, the discrepancy can be factored into the model, e.g., to indicate higher risk in the transaction.

In some implementations, interrelationships between particular data types can be factored into the model. For example, image data can indicate changes in the parcel of real property over time (e.g., remodeling). The presence or absence of permit data can provide information about how to use the remodeling information. Interrelationships can be tested by interacting the particular data types within the model.

The output generated by the machine learning model 308 includes a prediction with respect to a parameter as well as an estimated magnitude of that parameter. For example, when generating a prediction with respect to a parcel of real property, the parameter can be whether or not there is a likely to be a title defect discovered for the parcel. The magnitude can reflect the expected cost of remedying the defect, for example, through an insurance claim.

The prediction of a title defect is based on the model of other parcels of real property. However, the prediction may also be based on specific data values of the particular parcel of real property.

The output of the machine learning model 308 is provided to a decision engine 310. The decision engine 310 evaluates the prediction and magnitude for the parameter to determine an action decision. The evaluation can include comparing the magnitude to a threshold value. For example, if the magnitude is greater than the threshold value, then the parcel of real property can be flagged for further processing. In the example used for a parcel of real property, exceeding the threshold can mean that the full traditional title search and evaluation needs to be performed to determine any actual defects. By contrast, if the parameter is null or if the magnitude is below the threshold value, the decision engine 310 can determine that title insurance should be issued. In some implementations, the decision engine 310 further recommends a pricing for the title insurance based on the magnitude of the predicted parameter.

In some implementations, the threshold is set based upon an analysis of multiple factors. For example, a collection of historical data can be used to determine an historical occurrence and magnitude for the parameter. In the case of title defects, this can include past occurrences of title defects and the value of the resulting claims. Few instances of significant defects can lead, for example, to a higher threshold level of risk being acceptable. Updated information can be used to revise the threshold.

In some implementations, determining the threshold can include analyzing historical information on past claims relative to other operating expenses and revenue in order to determine the threshold level such that the model will only pass predicted occurrences of a title defect having magnitudes of cost within an acceptable amount of overall cost relative to revenue.

The output of the decision engine 310 can be provided to one or more users 312. For example, the decision can be added to a file associated with the parcel of real property and a user associated with the file can be alerted to the decision. In some implementations, the decision is determined while an associated user is working with the system and the decision can be displayed in a user interface of the system.

Figure 4:
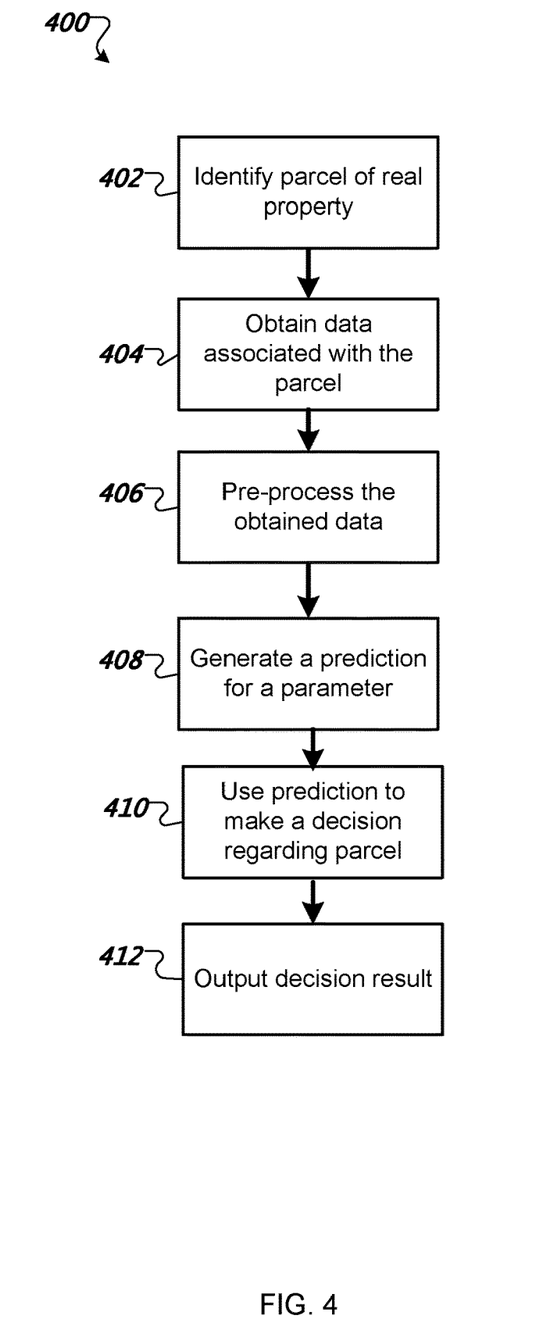
FIG. 4 is a flow diagram of an example method for using a machine learning model to generate a prediction.

FIG. 4 is a flow diagram of an example method for using a machine learning model to generate a prediction. For convenience, the method 400 will be described with respect to a system that performs the method 400, for example, the example system 300 of FIG. 3.

The system receives an identification of a particular parcel of real property (402). For example, a user can input an address corresponding to the parcel of real property. In some implementations, additional information associated with the parcel of real property is provided, for example, information about a prospective purchaser of the parcel. The information can include, for example, the purchaser name, current address, or other identifying information.

The system obtains data associated with the parcel of real property (404). The data can be obtained from various different data sources. In particular, the data can be obtained as described above with respect to the data aggregator 302. The obtained data can include values for particular data types as well as documents that require pre-processing to extract values for particular data types. The set of data types can be pre-defined, for example, when training a machine learning model to use the particular data types as features.

The system pre-processes the obtained data (406). In particular, data that is not already in the form of a (data type, value) pair can be processed to extract the (data type, value) pairs. The pre-processing can be performed, for example, by the pre-processing engine 306 to extract (data type, value) pairs from both structured and unstructured data associated with the parcel of real property.

The system generates a prediction for a parameter (408). In particular, the (data type, value) pairs from the obtained data can be provided as input to a machine learning model that is trained to generate a prediction for a parameter and its magnitude. The machine learning model can be similar to machine learning model 308 trained as described above with respect to FIGS. 1-2.

The system uses the generated prediction for the parameter to make a decision regarding the parcel of real property (410). The decision can be, for example, a decision on whether to issue title insurance for the parcel or real property or perform further title investigation. As described above with respect to decision engine 310, the decision can be based on a comparison of the magnitude of the prediction parameter to a threshold value. The threshold value can involve an assessment of acceptable risk based on the prediction. Parameter values that fail to satisfy the threshold value can be denied issuance of title insurance or can be flagged for a full title search to determine whether a title defect actually exits in the parcel of real property.

The system outputs the results (412). The output result can include transmitting or displaying a result to one or more users of the system. In some implementations, the output provides recommendations to the one or more users for making a decision regarding the parcel of real property rather than a definitive decision from the decision engine 310.

Figure 5:
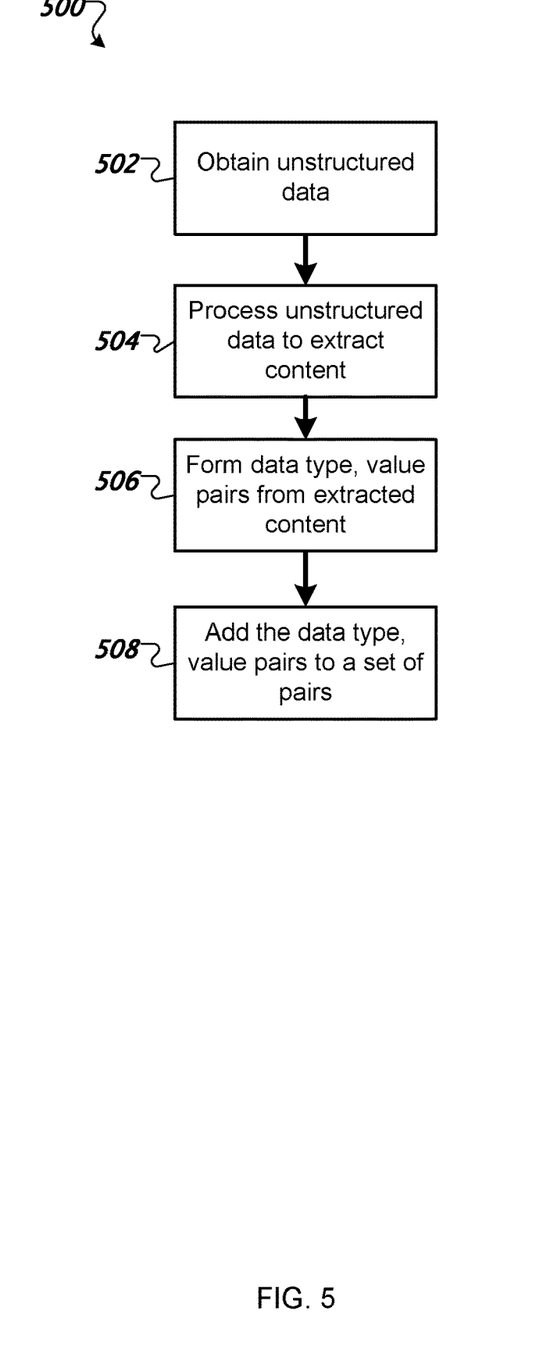
FIG. 5 is a flow diagram of an example method for processing data from one or more unstructured data sources.

FIG. 5 is a flow diagram of an example method 500 for processing data from one or more unstructured data sources. For convenience, the method 500 will be described with respect to a system that performs the method 500, for example, the example system 300 of FIG. 3.

The system obtains unstructured data (502). The unstructured data can be obtained, for example, by a data aggregator (e.g., data aggregator 302) of the system. The obtained unstructured data can include, for example, documents where text can be extracted through a text recognition process or images that can be analyzed using image recognition techniques. For example, one form of unstructured data can include an appraisal document for a parcel of real property. The appraisal document can include a description of the property including condition information as well as an estimation of value for the property.

The system processes the unstructured data to extract content (504). For example, a pre-processing engine (e.g., pre-processing engine 306) can analyze the unstructured data to extract content corresponding to a known data type and any value associated with the data type. The processing can include parsing textual content of the unstructured content using any suitable parsing technique. In some implementations, the processing includes performing optical character recognition on the text of the received unstructured data to generate parseable text. The parsing can include identifying text that matches particular data types used by the system and determining any properly formatted values in proximity to the identified data type.

In some other implementations, image content can be analyzed using image recognition techniques that identify particular content within images. Using the identified image content alone or in combination with an associated text (e.g., a caption or text that references the image), the system can determine whether the image content is associated with any specified data types. For example, a data type can be a condition associated with the parcel of real property. The identified content and/or associated description can be determined to relate to the condition of the parcel of real property.

The system forms (data type, value) pairs from the extracted content (506). The system adds the (data type, value) pairs to a set of (data type, value) pairs collected from all the obtained data (508).

Evaluating and Updating the Machine Learning Model

Because the model is trained on a specific set of training data, it is important to evaluate whether data input to the trained model (e.g., test data) is in agreement with the training data. If the test data diverges from the training data, e.g., for one or more data types, additional weights can be applied to the model to try to correct for the discrepancy so that the training data is as similar as possible to the test data.

In some implementations, incoming data to the model is monitored over time to determine whether the input data is significantly different from the assumptions (i.e., based on the training data) that the model is trained on. Based on the monitoring, the threshold can become more conservative (for example, increasing the threshold so that there are fewer pass decisions based on the occurrence and magnitude of the parameter) or the system can temporarily halt any further decisions. For example, the model can assume particular distributions for each of the data types. When input data is outside of the distributions, the risk can be adjusted in the form of changing the threshold. The threshold can be adjusted over time based on what input data is entering the model and may be different day by day.

Figure 6:
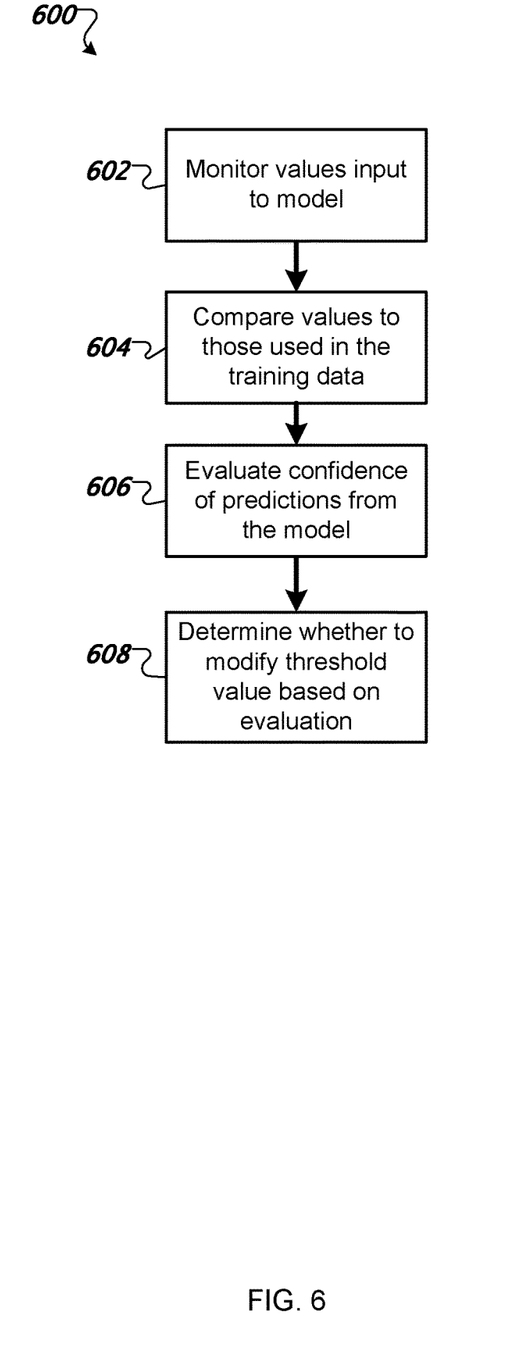
FIG. 6 is a flow diagram of an example method for evaluating a machine learning model.

FIG. 6 is a flow diagram of an example method for evaluating a machine learning model. For convenience, the method 600 will be described with respect to a system that performs the method 600.

The system monitors values from (data type, value) pairs used as input to a machine learning model (e.g., machine learning model 308) (602). For example, a copy of the set of (data type, value) pairs input to the machine learning model can be provided to a repository accessible by an evaluation engine.

Once a specified amount of data sets have been collected, or specified time period has elapsed, the system compares the values for data types input to the system to the range of values for data types identified in the training data for the machine learning model (604). For example, a data type can be a size home size. The training data can have a range of home sizes used, for example, 1,000 square feet to 3,000 square feet. Another data type can be last sales price for a parcel of real property. The training data can have a range of last sales prices, for example, $150,000 to $450,000.

The system evaluates a confidence of the predictions from the machine learning model based on the comparison (606). For example, the system can determine how much agreement there is between the values used in training and the values actually input to the machine learning model. This comparison allows the system to determine whether the values of data types actually input to the model look similar to the values for data types used to train the model. For example, using the example values above, if the actual input last sales price values input to the system are between $50,000 and $150,000, this can indicate that the model may not accurately assess this data type since it is below the range of values used in training the machine learning model. In another example, the actual input home size values can range from 1,050 square feet to 2,200 square feet. This can indicate a higher confidence for the model's incorporation of the home size data type because the range of values actually input are comparable to those used to train the model.

The system determines whether to modify a threshold value used by a decision engine, e.g., decision engine 310, based on the evaluation (608). In some implementations, the threshold value can be decreased such that the decision engine flags a particular parcel of real property at a lower magnitude for the parameter. Determining whether to modify the threshold value can be based on multiple factors including, for example, how much the input data type values deviate from the value ranges of the data types of the training data; how much the particular deviating data types are weighted in the model; and/or how many data types of the model are affected.

Essentially, the less that the data input to the model looks like the data used to train the model, the less confidence there is in the model prediction for the parameter. An increase in risk based on the lower confidence can be used to modify the threshold to make the "passing" value lower. As a result, more parcels of real property may be flagged for full evaluation rather than recommending insurance based on the model outcome. Eventually, this may require an updating of the model to encompass a broader range of input data values.

Figure 7:
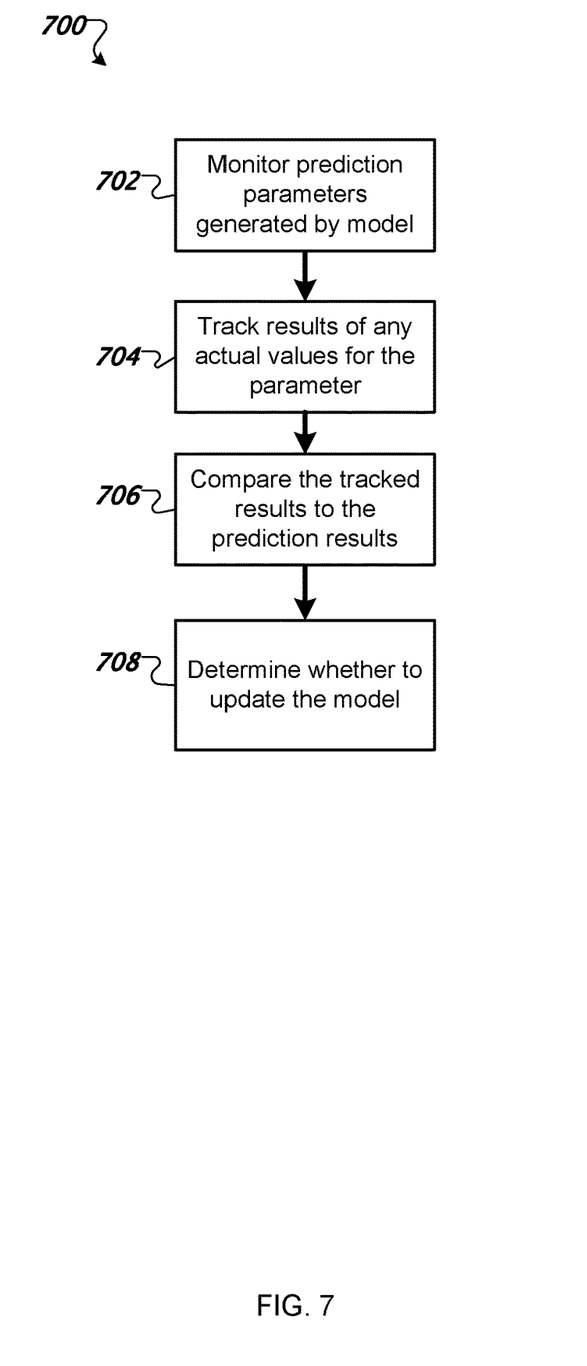
FIG. 7 is a flow diagram of an example method for validating and updating a machine learning model.

FIG. 7 is a flow diagram of an example method for validating and updating a machine learning model. For convenience, the method 700 will be described with respect to a system that performs the method 700.

The system monitors prediction parameters and magnitudes generated by a machine learning model, e.g., machine learning model 308, (702). For example, a copy of each prediction parameter and magnitude generated by the machine learning model can be provided to a repository accessible by an update engine over a specified time period.

The system tracks results of any actual values for the parameter determined following the generation of the prediction for the parameter (704). For example, for title defect prediction results that do not satisfy the threshold, a full title evaluation can be performed for the parcel of real property to determine the actual magnitude of the parameter. In some other instances, a title defect may be found later (e.g., before or after closing on a real estate transaction) for a parcel of real property that satisfied the threshold based on the model output.

The system compares the tracked results for the actual values of the parameter to the prediction results (706). For example, the system can compare both a binary change e.g., predictions that a non-zero value of the parameter exist as compared with actual results as well as differences in the magnitude for the parameter.

The system determines whether to update the model based on the comparison (708). For example, if the comparison results in a variance from the predicted and actual values that is greater than a specified allowed variance, then the model can be updated to try to improve the predictions. For example, additional training data can be acquired and used to retrain the machine learning model. In particular, the parcels of real property in which the actual values for the parameter were obtained can be used as additional training data so that the updated model generates more accurate predictions for (data type, value) pairs input to the model that are similar to those parcels.

In some implementations of the above described techniques, some of the obtained data can be associated with particular individuals. The techniques can be implemented to protect individual privacy and include suitable controls on access to the information. For example, the personal information of a prospective buyer of a parcel of real property can be used in response to received consent from the prospective buyer. In some cases, identifiable information of individual can also be anonymized using a suitable technique and appropriate safeguards placed to protect the personal information.

In some implementations, in addition to, or alternative to, generating a prediction for the parameter, e.g., title risk, the model can be used to generate an overall evaluation of the parcel of real property similar to a title abstract. In particular, based on the input information the model can output a chain of title indicating prior transactions as well as identifying any claims, pending or resolved, along the chain. This can be used to illustrate locations of risk along a transaction timeline as well as provide an overview of the property history.

Conventional risk assessment for parcels of real property includes generating a title abstract that shows a chain of title of each transaction involving the purchase or sale of the parcel of real property. The title abstract further includes an identification of any defects such as unresolved liens against the parcel of real property. Based on this information for the parcel, a determination can be made as to whether or not to insure the title against claims as part of a particular real estate transaction.

Generating the title abstract includes identifying records associated with the particular parcel of real property. This can include computer databases as well as physical searches of records at local level records repositories, e.g., county records buildings. If a defect is identified, it typically needs to be resolved (e.g., a lien removed), or potentially excluded from coverage, before title insurance is issued.

The present specification describes unconventional steps to solve problems associated with assessing title risk that are distinct from the conventional approach. In particular, a prediction of title risk can be generated using a model based on other parcels of real property where the model prediction may also be based on specific data values of the particular parcel of real property. This allows a prediction to be generated without having to assess complete information about the parcel of real property and can often be performed quicker than a traditional title assessment.

In this specification, the term "database" is used broadly to refer to any collection of data: the data does not need to be structured in any particular way, or structured at all, and it can be stored on storage devices in one or more locations.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining, in real-time and from one or more sources, a plurality of data points associated with a specified parcel of real property;
    using a machine learning model to generate a prediction from the obtained plurality of data points, the prediction indicating a likelihood that the real property will satisfy a particular parameter, the particular parameter indicating a likelihood that the real property has a title defect, and a predicted scope for the parameter, wherein the machine learning model is trained using a training set comprising a collection of data points associated with a labeled set of a plurality of real property parcels distinct from the specified parcel of real property, wherein the data points for each real property parcel comprises one or more data types, the data types including statistical information about the real property parcel and a retail history of the property, and wherein each label indicates the actual historical occurrence and value for the particular parameter for each real property parcel of the training set such that the training set includes one or more real property parcels labeled as having a title defect of specified value and one or more real property parcels labeled as not having a title defect; and
    based on the prediction indicating the likelihood that the real property has a title defect and the predicted scope for the title defect, classifying the specified parcel of real property according to a determination of whether the predicted scope satisfies a threshold value.

2. The method of claim 1, wherein the obtained plurality of data points comprises a variety of data from a variety of data sources.

3. The method of claim 2, wherein the obtained plurality of data points is obtained from both structured data sources and unstructured data sources.

4. The method of claim 3, wherein obtaining data points from unstructured data sources includes processing unstructured data in the unstructured data sources to identify particular types of information including performing image recognition on images contained within the unstructured data.

5. The method of claim 1, wherein each data point is associated with a particular data type and wherein each data type is weighted in the machine learning model.

6. The method of claim 5, wherein the weight given to each data type varies depending on a particular mix of data types input to the machine learning model.

7. The method of claim 1, wherein values for data points input into the machine learning model for different parcels of real property are tracked to determine whether the values actually input correspond to values anticipated by the machine learning model.

8. The method of claim 1, wherein an actual outcome with respect to the particular parameter for the specific parcel of real property is determined and compared with the prediction.

9. The method of claim 8, wherein in response to identifying inaccuracies in one or more predictions, adjusting the machine learning model based on updated training data.

10. A system comprising:
    one or more computers and one or more storage devices storing instructions that are operable, when executed by the one or more computers, to cause the one or more computers to perform operations comprising:

obtaining, in real-time and from one or more sources, a plurality of data points associated with a specified parcel of real property;

using a machine learning model to generate a prediction from the obtained plurality of data points, the prediction indicating a likelihood that the real property will satisfy a particular parameter, the particular parameter indicating a likelihood that the real property has a title defect, and a predicted scope for the parameter, wherein the machine learning model is trained using a training set comprising a collection of data points associated with a labeled set of a plurality of real property parcels distinct from the specified parcel of real property, wherein the data points for each real property parcel comprises one or more data types, the data types including statistical information about the real property parcel and a retail history of the property, and wherein each label indicates the actual historical occurrence and value for the particular parameter for each real property parcel of the training set such that the training set includes one or more real property parcels labeled as having a title defect of specified value and one or more real property parcels labeled as not having a title defect; and based on the prediction indicating the likelihood that the real property has a title defect and the predicted scope for the title defect, classifying the specified parcel of real property according to a determination of whether the predicted scope satisfies a threshold value.

11. The system of claim 10, wherein the obtained plurality of data points comprises a variety of data from a variety of data sources.

12. The system of claim 11, wherein the obtained plurality of data points is obtained from both structured data sources and unstructured data sources.

13. The system of claim 12, wherein obtaining data points from unstructured data sources includes processing unstructured data in the unstructured data sources to identify particular types of information including performing image recognition on images contained within the unstructured data.

14. The system of claim 10, wherein each data point is associated with a particular data type and wherein each data type is weighted in the machine learning model.

15. The system of claim 14, wherein the weight given to each data type varies depending on a particular mix of data types input to the machine learning model.

16. The system of claim 10, wherein values for data points input into the machine learning model for different parcels of real property are tracked to determine whether the values actually input correspond to values anticipated by the machine learning model.

17. The system of claim 10, wherein an actual outcome with respect to the particular parameter for the specific parcel of real property is determined and compared with the prediction.

18. The system of claim 17, wherein in response to identifying inaccuracies in one or more predictions, adjusting the machine learning model based on updated training data.

19. One or more non-transitory computer-readable storage media encoded with instructions that, when executed by one or more computers, cause the one or more computers to perform operations comprising:

obtaining, in real-time and from one or more sources, a plurality of data points associated with a specified parcel of real property;

using a machine learning model to generate a prediction from the obtained plurality of data points, the prediction indicating a likelihood that the real property will satisfy a particular parameter, the particular parameter indicating a likelihood that the real property has a title defect, and a predicted scope for the parameter, wherein the machine learning model is trained using a training set comprising a collection of data points associated with a labeled set of a plurality of real property parcels distinct from the specified parcel of real property, wherein the data points for each real property parcel comprises one or more data types, the data types including statistical information about the real property parcel and a retail history of the property, and wherein each label indicates the actual historical occurrence and value for the particular parameter for each real property parcel of the training set such that the training set includes one or more real property parcels labeled as having a title defect of specified value and one or more real property parcels labeled as not having a title defect; and based on the prediction indicating the likelihood that the real property has a title defect and the predicted scope for the title defect, classifying the specified parcel of real property according to a determination of whether the predicted scope satisfies a threshold value.

* * * * *

(12) EX PARTE REEXAMINATION CERTIFICATE (12075th)
United States Patent
Simkoff et al.

(10) Number: US 10,255,550 C1
(45) Certificate Issued: Jun. 22, 2022

(54) MACHINE LEARNING USING MULTIPLE INPUT DATA TYPES

(71) Applicant: States Title, Inc., San Francisco, CA (US)

(72) Inventors: Maxwell Simkoff, San Francisco, CA (US); Michael Housman, Beverly Hills, CA (US)

(73) Assignee: CALATLANTIC TITLE GROUP, LLC, Miami, FL (US)

Reexamination Request:
No. 90/014,691, Mar. 5, 2021

Reexamination Certificate for:
Patent No.: 10,255,550
Issued: Apr. 9, 2019
Appl. No.: 15/616,249
Filed: Jun. 7, 2017

(51) Int. Cl.
*G06N 3/08* (2006.01)
*G06N 20/00* (2019.01)
*G06N 7/00* (2006.01)

(52) U.S. Cl.
CPC ............... *G06N 3/08* (2013.01); *G06N 7/005* (2013.01); *G06N 20/00* (2019.01)

(58) Field of Classification Search
None
See application file for complete search history.

(56) References Cited

To view the complete listing of prior art documents cited during the proceeding for Reexamination Control Number 90/014,691, please refer to the USPTO's public Patent Application Information Retrieval (PAIR) system under the Display References tab.

*Primary Examiner* — Eric B. Kiss

(57) ABSTRACT

Methods, systems, and apparatus, including computer programs encoded on computer storage media, for training and applying a machine learning model. One of the methods includes the actions of obtaining a plurality of data points associated with a specified object; using a machine learning model to generate a prediction from the obtained plurality of data points, the prediction indicating a likelihood that the object will satisfy a particular parameter and a predicted scope for the parameter, wherein the machine learning model is trained using a training set comprising a collection of data points associated with a labeled set of objects, the label indicating the particular parameter and value for each object of the training set; and based on the prediction, classifying the specified object according to a determination of whether the predicted scope satisfies a threshold value.

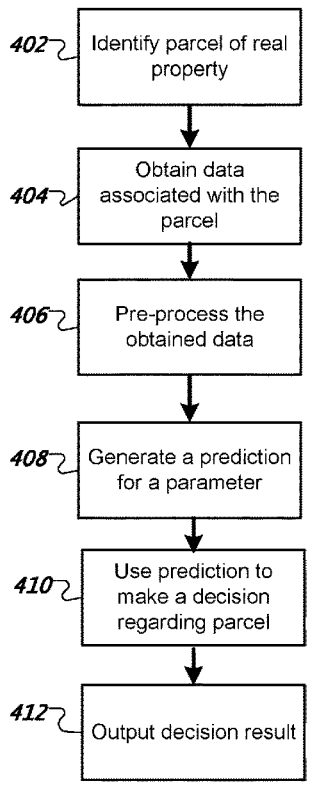

US 10,255,550 C1

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 10 and 19 are determined to be patentable as amended.

Claims 2-9 and 11-18, dependent on an amended claim, are determined to be patentable.

New claims 20-34 are added and determined to be patentable.

1. A method comprising:
    obtaining, in real-time and from one or more sources, a plurality of data points associated with a specified parcel of real property;
    using a machine learning model to generate a prediction from the obtained plurality of data points, the prediction indicating a likelihood that the real property will satisfy a particular parameter, the particular parameter indicating a likelihood that the real property has a title defect, and a predicted scope for the parameter, *wherein the predicted scope corresponds to an estimated magnitude of the particular parameter, and the estimated magnitude of the particular parameter reflects an expected cost of remedying the title defect through an insurance claim,* wherein the machine learning model is trained using a training set comprising a collection of data points associated with a labeled set of a plurality of real property parcels distinct from the specified parcel of real property, wherein the data points for each real property parcel comprises one or more data types, the data types including statistical information about the real property parcel and a retail history of the property, and wherein each label indicates [the] *a respective* actual historical occurrence and *a corresponding respective* value for the particular parameter for each real property parcel of the training set such that the training set includes one or more real property parcels labeled as having a title defect of specified value and one or more real property parcels labeled as not having a title defect; and
    based on the prediction indicating the likelihood that the real property has a title defect and the predicted scope for the title defect, classifying the specified parcel of real property according to a determination of whether the predicted scope satisfies a threshold value.

10. A system comprising:
    one or more computers and one or more storage devices storing instructions that are operable, when executed by the one or more computers, to cause the one or more computers to perform operations comprising:
    obtaining, in real-time and from one or more sources, a plurality of data points associated with a specified parcel of real property;
    using a machine learning model to generate a prediction from the obtained plurality of data points, the prediction indicating a likelihood that the real property will satisfy a particular parameter, the particular parameter indicating a likelihood that the real property has a title defect, and a predicted scope for the parameter, *wherein the predicted scope corresponds to an estimated magnitude of the particular parameter, and the estimated magnitude of the particular parameter reflects an expected cost of remedying the title defect through an insurance claim,* wherein the machine learning model is trained using a training set comprising a collection of data points associated with a labeled set of a plurality of real property parcels distinct from the specified parcel of real property, wherein the data points for each real property parcel comprises one or more data types, the data types including statistical information about the real property parcel and a retail history of the property, and wherein each label indicates [the] *a respective* actual historical occurrence and *a corresponding respective* value for the particular parameter for each real property parcel of the training set such that the training set includes one or more real property parcels labeled as having a title defect of specified value and one or more real property parcels labeled as not having a title defect; and
    based on the prediction indicating the likelihood that the real property has a title defect and the predicted scope for the title defect, classifying the specified parcel of real property according to a determination of whether the predicted scope satisfies a threshold value.

19. One or more non-transitory computer-readable storage media encoded with instructions that, when executed by one or more computers, cause the one or more computers to perform operations comprising:
    obtaining, in real-time and from one or more sources, a plurality of data points associated with a specified parcel of real property;
    using a machine learning model to generate a prediction from the obtained plurality of data points, the prediction indicating a likelihood that the real property will satisfy a particular parameter, the particular parameter indicating a likelihood that the real property has a title defect, and a predicted scope for the parameter, *wherein the predicted scope corresponds to an estimated magnitude of the particular parameter, and the estimated magnitude of the particular parameter reflects an expected cost of remedying the title defect through an insurance claim,* wherein the machine learning model is trained using a training set comprising a collection of data points associated with a labeled set of a plurality of real property parcels distinct from the specified parcel of real property, wherein the data points for each real property parcel comprises one or more data types, the data types including statistical information about the real property parcel and a retail history of the property, and wherein each label indicates [the] *a respective* actual historical occurrence and *a corresponding respective* value for the particular parameter for each real property parcel of the training set such that the training set includes one or more real property parcels labeled as having a title defect of specified value and one or more real property parcels labeled as not having a title defect; and
    based on the prediction indicating the likelihood that the real property has a title defect and the predicted scope for the title defect, classifying the specified parcel of real property according to a determination of whether the predicted scope satisfies a threshold value.

20. The method of claim 5, comprising:
    determining, by the machine-learning model, a corresponding weight for each particular data type that has an association with a corresponding data point.
21. The method of claim 1, comprising:
    providing a subset of data values derived from the training set as input to the machine learning model;
    monitoring the subset of data values derived from the training set; and
    determining whether the machine learning model was trained using data values that are comparable to an actual input data value.
22. The method of claim 1, wherein the prediction corresponding to the particular parameter is stored and later compared to an actual value for the particular parameter.
23. The method of claim 1, comprising:
    identifying one or more predictions errors associated with the machine-learning model; and
    using the prediction errors to update the machine learning model.
24. The method of claim 1, comprising:
    extracting one or more features from the training data; and
    determining an assignment of weights to the features such that a prediction and magnitude for the parameter correspond to known parameter values.
25. The method of claim 24, wherein each of the one or more features correspond to distinct types of data in the training set, and the method comprises:
    iteratively training the model; and
    adjusting features and associated weights to a particular degree of accuracy relative to the known parameter values.
26. The method of claim 1, wherein the statistical information about the real property parcel comprises at least one of a size of the real property parcel, an age of the real property parcel, or a composition of the real property parcel.
27. The method of claim 26, wherein the statistical information about the real property parcel comprises at least one of prior dates of sale of the real property parcel, characterizations of property conditions specific to the real property parcel, and an appraisal report for the real property parcel.

28. The method of claim 1, comprising:
    generating, using the machine learning model, an overall evaluation of the real property parcel, wherein the overall evaluation corresponds to a title abstract.
29. The method of claim 1, comprising:
    based on input information submitted to the machine learning model, generating an output comprising a chain of title indicating prior transactions involving the specified parcel of real property.
30. The method of claim 29, comprising:
    based on input information submitted to the machine learning model, identifying one or more pending claims or resolved claims along the chain of title.
31. The method of claim 1, comprising:
    determining, using the machine learning model, one or more locations of risk along a transaction timeline involving the specified parcel of real property; and
    providing an overview of a property history for the specified parcel of real property.
32. The method of claim 1, comprising:
    obtaining a collection of historical data;
    based on the collection of historical data, determining a historical occurrence of a title defect and a magnitude for the particular parameter,
    wherein the historical occurrence and the magnitude comprises past occurrences of title defects and a value of any resulting claims against a chain of title.
33. The method of claim 1, comprising:
    comparing a set of tracked results for actual values of the particular parameter to a set of prediction results; and
    determining whether to update the machine learning model based on the comparison.
34. The method of claim 33, comprising:
    determining that the comparison results in a variance from the prediction results and actual values that is greater than a specified allowed variance; and
    updating the machine learning model to pursue an improvement in the accuracy of predictions generated by the machine learning model.

* * * * *